March 13, 1928.
R. R. PARRY
1,662,205
DRINKING GLASS WASHING APPARATUS
Filed Jan. 2, 1925   3 Sheets-Sheet 1
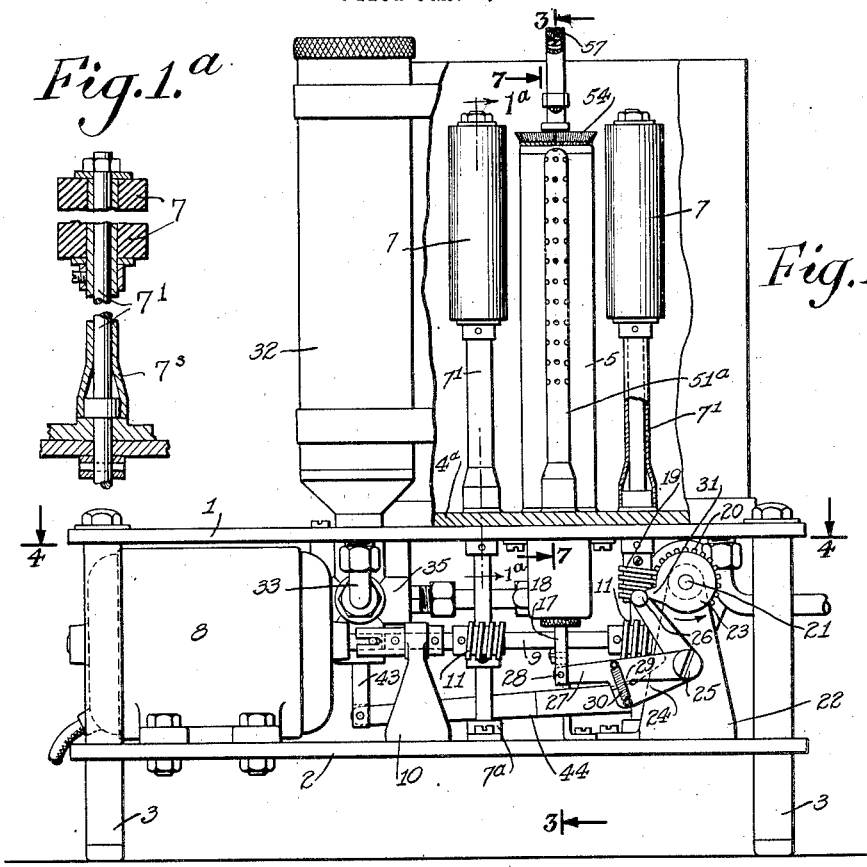
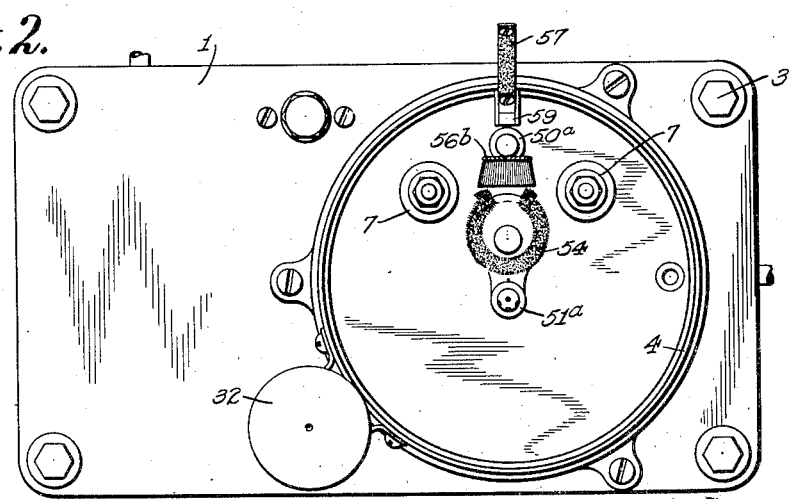
Inventor
Robert R Parry,
By his Attorneys
Ward, Crosby and Smith March 13, 1928. 1,662,205
R. R. PARRY
DRINKING GLASS WASHING APPARATUS
Filed Jan. 2, 1925 3 Sheets-Sheet 2
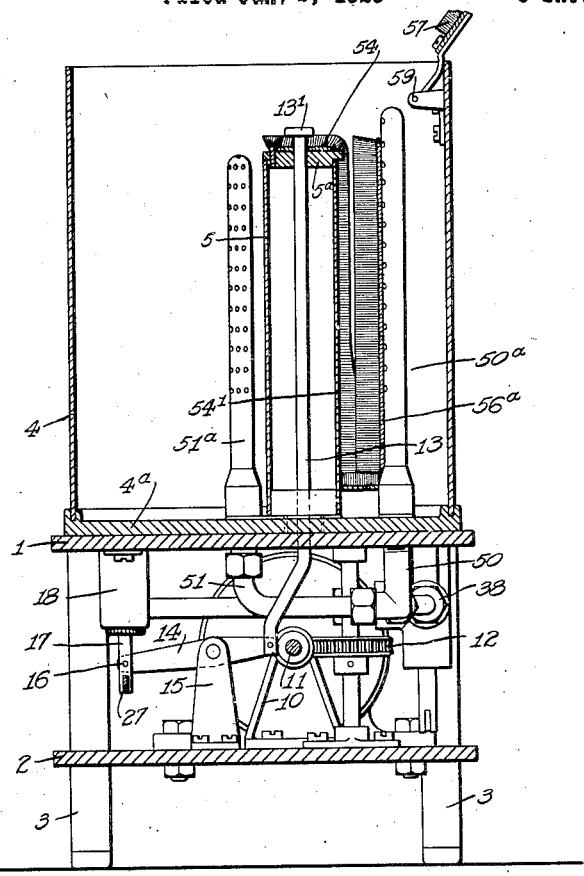
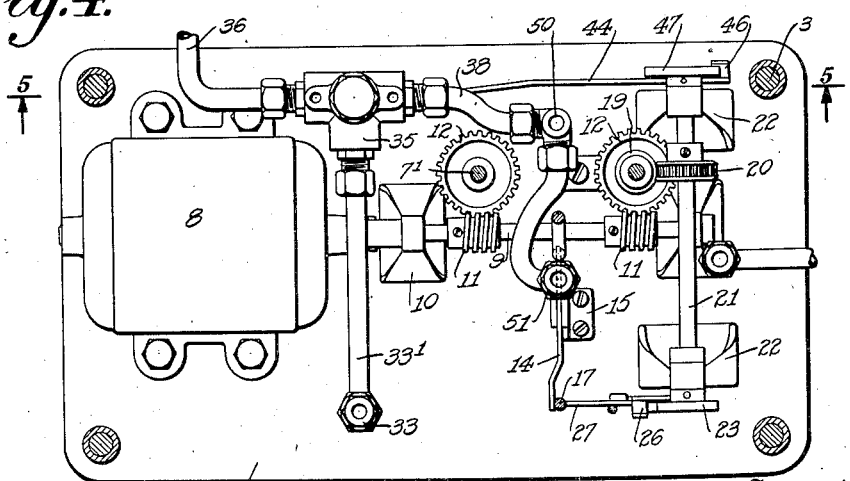
Inventor
Robert R. Parry,
By his Attorneys,
Ward, Crosby and Smith March 13, 1928. 1,662,205
R. R. PARRY
DRINKING GLASS WASHING APPARATUS
Filed Jan. 2, 1925 3 Sheets-Sheet 3
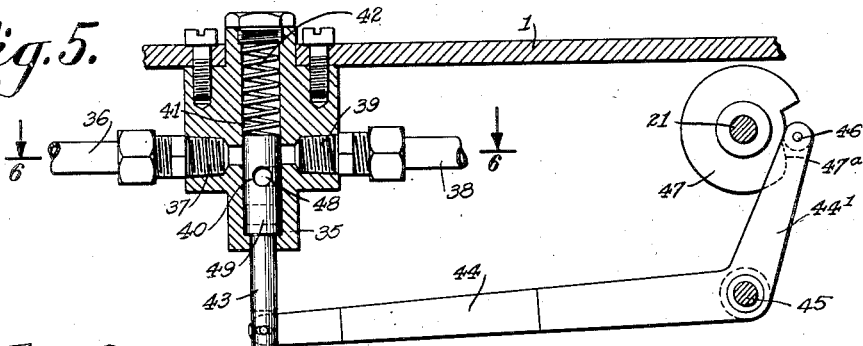
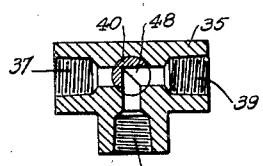
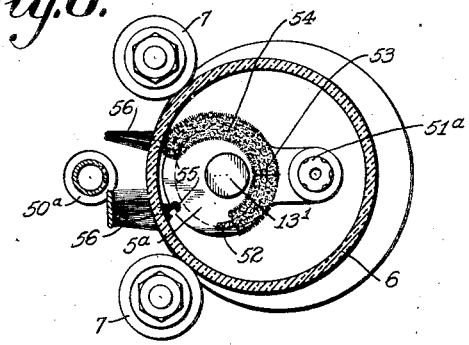
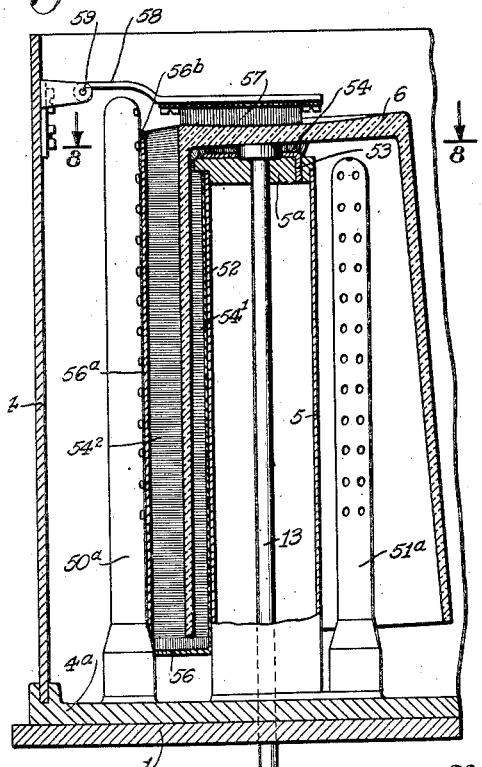
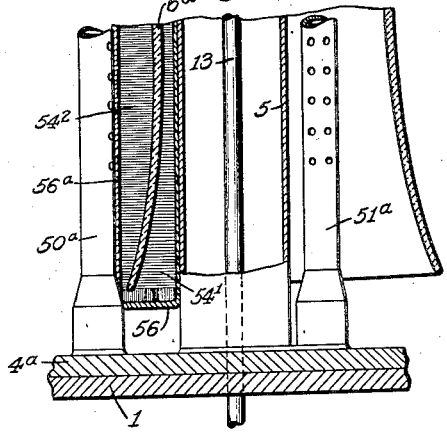
Inventor
Robert R. Parry,
By his Attorneys,
Wadd, Crosby and Smith Patented Mar. 13, 1928.

1,662,205

UNITED STATES PATENT OFFICE.

ROBERT R. PARRY, OF ELMHURST, NEW YORK, ASSIGNOR OF ONE-HALF TO CARL H. FOWLER, OF NEW YORK, N. Y.

DRINKING-GLASS-WASHING APPARATUS.

Application filed January 2, 1925. Serial No. 35.

The invention relates to improvements in drinking glass washing apparatus. It relates more particularly to apparatus whereby a tumbler or drinking glass may be effectively and quickly washed by an automatic mechanism.

In accordance with the invention devices are provided for rotating a glass or tumbler or similar article inserted in the apparatus, the rotating glass being thoroughly cleansed by engagement with suitable brushing or cleaning devices. The glass is subjected to soapy water while it is being thus rotated and brushed. Preferably the machine is automatically set in operation by the act of placing the glass therein so that the glass will be rotated for a suitable time interval, at the end of which time the moving parts are, preferably, automatically stopped. Preferably, also, a stream or jet of soapy water is automatically caused to flow against the inside and outside of the glass upon the insertion of the glass in the apparatus, the supply of soap and water preferably being discontinued at about the time the rotation of the glass ceases.

An object of the invention is the provision of efficient and comparatively simple devices of the character referred to, which may be used effectively for the washing of glasses or tumblers such as are used in homes, hotels, at soda fountains, etc. Preferably, the device is so arranged as to be adapted for operation upon tumblers or glasses of various shapes and sizes. Other objects of the invention comprise the provision of various combinations of parts and forms of construction all as will be more fully described in the following specification and be particularly pointed out in the appended claims.

The glass or tumbler having been washed, it may be dried by suitable means forming no part of the present invention.

In order that the invention may be more clearly understood attention is hereby directed to the accompanying drawings forming part of this application and illustrating one form of apparatus embodying the invention. In the drawings Fig. 1 represents a side elevation of apparatus embodying the invention;

Fig. 1ᵃ is a vertical section taken on line 1ᵃ—1ᵃ of Fig. 1 on an enlarged scale.

Fig. 2 is a top plan view of the same;

Fig. 3 is a vertical section taken on line 3—3 of Fig. 1;

Fig. 4 is a horizontal section taken on line 4—4 of Fig. 1;

Fig. 5 is a vertical section taken on line 5—5 of Fig. 4;

Fig. 6 is a sectional detail taken on line 6—6 of Fig. 5;

Fig. 7 is an enlarged vertical section through the tumbler support with tumbler mounted thereon, and through the tumbler cleaning devices, etc. taken on line 7—7, Fig. 1;

Fig. 8 is a horizontal section taken on line 8—8 of Fig. 7, and

Fig. 9 is a partial vertical section similar to the lower part of Fig. 7 but showing the operation upon a tumbler of flaring shape.

Referring to the drawings, the apparatus as shown comprises upper and lower horizontal plates or supports 1 and 2 mounted upon and supported by suitable legs or vertical supports 3.

A suitable tank 4, having bottom 4ᵃ, is supported upon the upper horizontal plate 1. Within this tank is mounted the stationary cylindrical tumbler support 5, over which a tumbler may be positioned upside down as is indicated at Fig. 7, where the tumbler is shown at 6.

The tumbler upon support 5 will be rotated by frictional engagement with the vertical cylinders 7, 7, which are adapted to bear against the cylindrical outer surface of the glass. Rotating cylinders 7 may be provided with any desired surface material which may be adapted to frictionally engage the glass. Cylinders 7 are provided with or mounted upon spindles 7¹ which extend downwardly through plate 1 in which they have suitable bearing, the lower ends of these spindles being shown as provided with bottom bearings 7ᵃ in plate 2. Sleeve 7ˢ is indicated in Fig. 1ᵃ as surrounding each spindle 7' and rotating therewith, these sleeves being merely provided for the purpose of giving a bearing surface for the cylinders 7. Cylinders 7 are so positioned that a tumbler mounted on support 5 will have its outer cylindrical surface pressed firmly against the surface of cylinders 7 so that the rotation of the latter will impart rotation to the tumbler.

Rotation of the cylinders 7 may be effected in various ways. As illustrated, this is effected by motor 8 connected to horizontal shaft 9 supported in suitable bearings such as 10. This shaft is provided with worms 11, 11, meshing with worm wheels 12, 12, on spindles 7¹.

The motor may, of course, be switched on and off when the tumbler is placed in the apparatus, and when it is removed, by various forms of device. In the preferred form of the invention these operations are carried out automatically. In the form of construction illustrated a vertical rod 13 extends upwardly through tumbler support 5 and a short distance above the top closure 5ª of support 5. Rod 13 is illustrated as provided with a button 13¹ at its upper end upon which the weight of the tumbler will rest when the tumbler is inserted in position. Rod 13 extends downwardly through a suitable stuffing box in the bottom of tank 4, and through plate 1 to a connection at its lower end with one end of arm 14. The latter is pivoted intermediate its ends upon a bracket 15 and its opposite end is pivotally connected at 16 to a vertical plunger 17 in a switch device 18 secured to and extending downwardly from the under side of plate 1. The depression of rod 13 by the weight of a glass positioned on button 13¹ results in the upward movement of plunger 17 in the switch device. This establishes a contact within the switch device whereby motor 8 is started in operation. Switch devices such as that referred to are well-known and it is not deemed necessary to illustrate the arrangement of contacts within the same. It is desirable to have the switch device provided with a form of impositive lock so that plunger 17 will remain in either its on or off position until moved therefrom, such devices being common.

As stated, the preferred form of the invention also includes means for automatically stopping the rotation of the cylinders 7 and consequently of the tumbler after the tumbler has been rotated for a desirable short time. This may suitably be accomplished by the mechanism for automatically stopping the motor after a predetermined number of operations, as illustrated. One of the spindles 7¹ is provided with a worm 19 which meshes with a worm wheel 20 on a horizontal shaft 21, which extends transversely across the machine and is supported by suitable brackets 22, which extend upwardly from bottom plate 2.

Shaft 21 is also provided with a cam 23. A bell crank lever 24 is pivotally mounted at 25 to bracket 22 and carries at its upper end a roller 26 which bears against the outer surface of cam 23. An arm 27 is pivotally mounted at one end, at 25, the other end of this arm being pivotally connected at 28 to the plunger 17 of switch device 18. Arm 27 and the lower arm of bell crank 24 are provided with faces or bosses as indicated at 29, Fig. 1, which are adapted to engage each other. A spring 30 connecting arm 27 with the lower arm of bell crank 24 tends to hold these faces in engagement at 29.

Cam 23 is provided with a nose 31 against which roller 26 bears when the device is not in operation. When a tumbler is positioned on support 5, starting the motor in operation by the swinging of arm 14 and the upward movement of plunger 17, as has been explained, arm 27 moves upwardly with plunger 17 against the pressure of spring 30. Cam 23 immediately starts rotating in a counterclockwise direction, referring to Fig. 1, and roller 26 drops off of nose 31 of the cam whereupon the lower arm of bell crank 24 moves upwardly a distance permitted by the engagement of roller 26 with the peripheral surface of cam 23, and by the engagement of the coacting faces at 29. The contacts of switch 18 accordingly remain closed during one complete rotation of cam 23 during which the tumbler which is to be washed is rotated as has been explained. At the end of one rotation of the cam, roller 26 will again ride out on the nose 31 of the cam, depressing the lower arm of bell crank 24, whereupon spring 30 pulls down arm 27 and plunger 17 to break the contacts within switch device 18 and accordingly stop the motor.

The devices by which the soap solution and hot water are brought into operation will now be described. Soap solution is contained within a container 32 which may be secured to the side of tank 4 in which the tumbler is washed. A pipe connection 33 extends downwardly from the bottom of the soap tank 32. Pipe connection 33 is provided with a transversely extending horizontally bent portion 33¹, Fig. 4, the end of pipe 33¹ having a threaded engagement within an opening 34, Fig. 6, of a valve member 35 which latter may be secured beneath plate 1, as shown in Fig. 5. Hot water from any suitable source is brought by pipe connection 36 into an opening 37 within valve member 35. A pipe connection 38 leads away from an opening 39 in the valve member which is in alignment with opening 37 and pipe 36, soap solution and hot water both being supplied through pipe 38 to tank 4 for the washing of the glass.

The admission of soap solution and hot water to pipe 38 may be governed by a suitable valve member 40 mounted within a suitable cylindrical bore 41 in valve member 35, valve 40 preferably being pressed downwardly into its inoperative position by a coiled spring 42 within the passage 41 referred to. Valve member 40, as shown is mounted upon a stem 43, the lower end of which is pivotally connected to arm 44 of a bell crank pivoted at 45 to one of the brackets 22. The upwardly extending arm 44¹ of the bell crank is provided with a roller 46 which engages against the periphery of a cam 47 mounted on shaft 21, previously described.

When the motor is set in operation, as has been described, shaft 21 immediately rotates to move roller 46 outwardly from the position shown in Fig. 5, stem 43 and valve 40 accordingly moving upwards. In the position of rest of valve 40 shown in Fig. 5, passages 34 and 37 leading from the soap solution and hot water supply, are both cut off by the cylindrical surface of the valve. Valve member 40 is provided with a transverse passageway 48 which, as is shown in Fig. 6, makes a right angle turn within the interior of the valve member. As roller 46 moves outwardly over the surface 47ᵃ of cam 47, this opening 48 will be brought into alignment with passages 34 and 39 of the stationary valve member 35. Accordingly soap solution from tank 32 will flow through this passage, by gravity, and into pipe 38, until the continued upward movement of valve member 40 has again closed this connection.

The further upward movement of member 40 will bring a passageway 49, which extends transversely through member 40, into alignment with passages 37 and 39. This occurs as soon as roller 46 reaches the outer cylindrical surface of cam 47, and this connection will be kept open during the remainder of the revolution of shaft 21. Accordingly, hot water from pipe 36 will pass through passage 49 and will take up the soap solution which has immediately preceded it into pipe 38, this hot water continuing to flow into pipe 38 until the end of one rotation of shaft 21, at which time roller 46 will drop back onto surface 47ᵃ of cam 47. Valve member 40 will at this time drop down into its inoperative seated position, as shown in Fig. 5.

The soap and hot water flow through pipe 38 and upwardly through a pair of vertical connections 50, 51. These extend upwardly through plate 1 and the bottom 4ᵃ of the washing tank 4. The upward extensions 50ᵃ and 51ᵃ of pipes 50, 51, within tank 4 are shown as closed at their top ends and provided with perforations throughout their lengths. The sprinkler head 50ᵃ thus formed is positioned outside the tumbler, while sprinkler head 51ᵃ is mounted inside the tumbler when the latter is in position to be washed, Fig. 7. Accordingly during the rotation of the tumbler hot soapy water will be projected continuously against the interior and exterior thereof. It is, of course, obvious that the soap and water might be projected against the glass by other means. The brushes or devices for rubbing against the glass will now be described. It is desirable that such devices should be provided to engage against the inner and outer cylindrical surfaces, and the inside bottom of the rotating glass. In the preferred construction illustrated, bristles are shown as secured upon a wire 52. The two ends of wire strip 52 are preferably secured adjacent to each other to the cap piece 5ᵃ of the tumbler support 5, these two ends preferably being inserted side by side in an opening in cap piece 5ᵃ, as is indicated at 53, Fig. 7. The position of the two ends 53 of the wire, on cap piece 5ᵃ may, for example, be at the point indicated at 53 in Fig. 8. The two portions of the wire separate above the upper surface of cap 5ᵃ, one portion extending in a clockwise direction, and the other in a counter-clockwise direction around the upper surface of cap 5ᵃ. These portions of the wire have fastened thereto bristles 54, as indicated.

The two portions of the wire after extending partly around the top surface of cap 5ᵃ, as stated, are bent downwardly at the points 55, 55, Fig. 8, these portions of the wire, with the bristles 54¹, carried thereby, extending downwardly along the outer surface of tumbler support 5 to a point adjacent the bottom 4ᵃ of tank 4. The wires then bend outwardly, as is indicated at 56, Fig. 7, after which they again extend upwardly, as is indicated at 56ᵃ these upwardly extending wire portions 56ᵃ carrying bristles 54². The two upwardly extending wire portions 56ᵃ with their bristles will be on the outer side of the tumbler when the latter is in position to be cleansed. The upwardly extending wire portions 56ᵃ are connected at top by a horizontal transverse loop 56ᵇ, which completes the course of the continuous length of wire.

It will be obvious that with this arrangement the inner or under surface of the inverted tumbler will be cleansed by contact with the bristles 54 as the tumbler is rotated and that the inner cylindrical surface of the tumbler will be engaged by bristles 54¹ and the outer cylindrical surface of the tumbler by bristles 54². If desired, the outer top surface of the reversed tumbler may be engaged by a brush device 57 carried by an arm 58, pivoted at 59 to a bracket extending inwardly from the wall of tank 4. This brush may be swung up out of the way, as indicated in Fig. 3, when the tumbler is dropped in position, the brush then being swung down into position to engage the top surface, as is indicated in Fig. 7.

It will be noted that the tumbler, or article being washed, is held in frictional contact with the rotating cylinders 7 by the pressure against the inner surface of the tumbler of the bristles 54¹ extending vertically along the cylindrical surface of support 5. The outer cylindrical surface of support 5, intermediate the two vertical lines of bristles 54¹, may also press against the inner surface of the tumbler to maintain the same in contact with cylinder 7.

It is obvious that the device will operate upon tumblers or the like articles of varying lengths, and of varying diameters within certain limits. It will also be seen that it will take care of tumblers of somewhat varying shapes. Thus, the tumbler may have straight sides, or may taper outwardly somewhat, the latter case being illustrated in Fig. 7. A tumbler which is flared or curved outwardly towards its upper edge may also be operated upon, as is indicated in Fig. 9, where a portion of such a tumbler is indicated at 6ᵃ. In this case the cylindrical surfaces 7 will engage only the straight portion of the tumbler, the outwardly flared portion not being interfered with because of the decreased diameters of spindles 7¹ below the cylindrical surface 7. The bristles 54² will be somewhat bent, or pressed back by the flared portion of the glass while the inside of the glass will be engaged by the bristles 54¹, which may be long enough, adjacent the lower portion of the glass, to engage the inside surface thereof.

It should be understood that the invention is not limited strictly to the details of construction which have been specifically described but that the same is as broad as is indicated by the accompanying claims.

What I claim is:

1. In drinking glass washing apparatus, the combination of a stationary vertical support, a plurality of vertical cylindrical members rotatably mounted on stationary shafts adapted to frictionally engage the outer surface of a glass positioned on said support, to rotate the same, said support having a curved surface between which and said cylindrical members the glass is positioned, means for rotating said cylindrical members, and means for cleansing the glass while it is being rotated.

2. In drinking glass washing apparatus, the combination of a stationary vertical support adapted to receive an inverted glass, rotatable means arranged adjacent said support and adapted to frictionally engage said glass for rotating the glass about said support, and means for automatically starting said rotatable means in operation upon the placing of said glass on the support, comprising a power member, and glass-operated means for connecting said power member to said rotatable means.

3. In drinking glass washing apparatus, the combination of a stationary vertical support adapted to receive an inverted glass thereon, rotatable means arranged adjacent said support and adapted to frictionally engage said glass for pressing one side of said glass towards said support, and for rotating the glass thereabout and stationary brush means carried by said support for rubbing against the inside surface of the glass.

4. In drinking glass washing apparatus, the combination of a glass support, means adapted to rub against a glass on said support, means for rotating said glass, an electric motor for driving the last named means, means for automatically starting said motor, and thereby causing relative movement of said rubbing means and glass, upon the placing of the glass on said support, comprising a switch and glass-operated means for closing said switch, a member rotatable during the operation of said motor, and means for stopping said motor after a predetermined rotation of said member.

5. In drinking glass washing apparatus, the combination of a vertical stationary support adapted to receive an inverted glass, thereon, a pair of vertical cylinders arranged adjacent said support and adapted to frictionally engage the outer surface of the glass positioned on said support to rotate the same, said cylinders being arranged one on each side of a plane containing the axes of said support and of the glass, said cylinders being positioned to press the adjacent side of the glass toward the support, and brush means carried by said support for rubbing against inside surfaces of the rotating glass.

6. In drinking glass washing apparatus, the combination of a glass support, glass cleaning means, adapted to rub against a glass positioned on said support, means for causing relative movement between the glass and said cleaning means, a soap solution container, a hot water connection, a spray adjacent to the glass, a pipe connected thereto, valve means connected with said pipe, and valve operating means, timed with relation to said means for causing relative movement during the relative movement between the glass and the cleaning means, for feeding a limited quantity of soap solution from said container to said pipe and for thereafter forcing hot water from said connection through said pipe to carry said soap solution through said spray.

7. In drinking glass washing apparatus, the combination of a glass support, means for rotating a glass on said support, means for projecting a jet of liquid against surfaces of the glass on said support, a rotatable shaft, timed in relation to said glass-rotating means, and means for actuating said liquid projecting means during a predetermined limited rotation only of said shaft.

8. In drinking glass washing apparatus, the combination of a glass support, means for rotating a glass on said support, for a limited period of rotation, stationary cleaning means engaging the glass when the latter rotates, valved connections for projecting a jet of liquid against a glass on said support, means for starting said rotating means in operation, to rotate a glass on said support, and means timed with relation to said glass-rotating means for opening said valved connections to project liquid on the rotating glass during the rotation thereof, only, and for again closing the same.

9. In drinking glass washing apparatus, the combination of a stationary vertical support adapted to receive an inverted glass, brush means carried by the top and side thereof, and rotatable means arranged to engage said glass to rotate the same and to press it into engagement with the portion of said brush means carried by the side of said support.

10. In drinking glass washing apparatus, the combination of a cylindrical support, brush means carried thereby, comprising a bristle-carrying wire, the two ends of which are secured to the top of said support, the two end portions extending in opposite directions over said top, thence downwardly, lengthwise of said support, thence again upwardly, but spaced from said support, to a connection between the two portions, said downwardly and upwardly extending brush portions being adapted to engage the inner and outer surfaces of a glass on said support, and means for imparting relative rotation to the glass and said brush means.

In testimony whereof I have signed my name to this specification.

ROBERT R. PARRY.